(12) United States Patent
Sun

(10) Patent No.: US 12,514,227 B1
(45) Date of Patent: Jan. 6, 2026

(54) PET PROTECTION COLLAR

(71) Applicant: Tingting Sun, Sichuan (CN)

(72) Inventor: Tingting Sun, Sichuan (CN)

( * ) Notice: Subject to any disclaimer, the term of this patent is extended or adjusted under 35 U.S.C. 154(b) by 0 days.

(21) Appl. No.: 19/332,164

(22) Filed: Sep. 18, 2025

(30) Foreign Application Priority Data

Mar. 20, 2025 (CN) .......................... 202530138244.5

(51) Int. Cl.
*A01K 13/00* (2006.01)

(52) U.S. Cl.
CPC .................................. *A01K 13/006* (2013.01)

(58) Field of Classification Search
CPC ......... A01K 13/006; A01K 27/00; A61D 9/00
See application file for complete search history.

(56) References Cited

U.S. PATENT DOCUMENTS

| | | | | |
|---|---|---|---|---|
| 3,036,554 | A * | 5/1962 | Johnson | A61D 9/00 119/815 |
| 4,200,057 | A * | 4/1980 | Agar | A01K 15/04 119/815 |
| 5,012,764 | A * | 5/1991 | Fick | A61D 9/00 119/856 |
| 5,797,354 | A * | 8/1998 | Marschall | A61D 9/00 119/815 |
| 8,181,609 | B2 * | 5/2012 | Ohashi | A01K 13/006 119/815 |
| 8,857,380 | B2 * | 10/2014 | Briggs | A61D 9/00 119/815 |
| 9,642,337 | B2 * | 5/2017 | Lippincott | A01K 13/006 |
| 11,252,939 | B2 * | 2/2022 | Winekoff | A61D 9/00 |
| 2011/0139091 | A1 * | 6/2011 | Ohashi | A01K 13/006 119/856 |
| 2012/0145093 | A1 * | 6/2012 | Martinez | A01K 13/006 119/863 |
| 2013/0055968 | A1 * | 3/2013 | Lippincott | A01K 13/006 119/821 |
| 2024/0324556 | A1 * | 10/2024 | Xu | A01K 13/006 |

FOREIGN PATENT DOCUMENTS

DE 102022119805 A1 * 2/2024 ............... A61D 9/00

* cited by examiner

*Primary Examiner* — Monica L Perry
(74) *Attorney, Agent, or Firm* — JEEN IP LAW, LLC

(57) ABSTRACT

A pet protection collar includes a first sheet, a second sheet, a first connecting component, and a second connecting component. The first sheet and the second sheet are substantially fan-shaped. The first sheet includes a first front portion, a first rear portion, a first side end and a second side end. A radius of the first front portion is greater than a radius of the first rear portion. The second sheet includes a second front portion, a second rear portion, a third side end, and a fourth side end. A radius of the second front portion is greater than a radius of the second rear portion. The first connecting component is configured to connect the first side end of the first sheet to the third side end of the second sheet. The second connecting component is configured to connect the first sheet to the second sheet.

20 Claims, 7 Drawing Sheets

PET PROTECTION COLLAR

TECHNICAL FIELD

The present disclosure relates to a field of pet products, and in particular to a pet protection collar.

BACKGROUND

When pets (such as dogs and cats) are injured or ill, they instinctively lick an injured part or an affected area repeatedly, making the injured part or the affected area difficult to heal and increasing the risk of infection. Therefore, protective collars, also known as Elizabethan collars, are created to protect the pets. While the Elizabethan collars prevent pets from licking their injured part or affected area, the Elizabethan collars restrict movements of the pets to a certain extent, such that the Elizabethan collars are inconvenient for daily use.

SUMMARY

To solve problems in the prior art, the present disclosure provides a pet protection collar.

The pet protection collar comprises a first sheet, a second sheet, a first connecting component, and a second connecting component.

The first sheet is substantially fan-shaped. The first sheet comprises a first front portion, a first rear portion, a first side end and a second side end. The first front portion extends from the first side end to the second side end. The first rear portion extends from the first side end to the second side end. A radius of the first front portion is greater than a radius of the first rear portion.

The second sheet is substantially fan-shaped. The second sheet comprises a second front portion, a second rear portion, a third side end, and a fourth side end. The second front portion extends from the third side end to the fourth side end. The second rear portion extends from the third side end to the fourth side end. A radius of the second front portion is greater than a radius of the second rear portion.

The first connecting component is configured to connect the first side end of the first sheet to the third side end of the second sheet. The second connecting component is configured to connect the second side end of the first sheet to the fourth side end of the second sheet, so that the first sheet and the second sheet are enclosed to form the pet protective collar that is substantially conical.

In one embodiment, the first rear portion of the first sheet and the second rear portion of the second sheet are enclosed to be worn on a neck of a pet. The first front portion of the first sheet and the second front portion of the second sheet are enclosed to surround a head of the pet.

In one embodiment, the first side end of the first sheet is detachably connected to the third side end of the second sheet through the first connecting component. The second side end of the first sheet is detachably connected to the fourth side end of the second sheet through the second connecting component.

In one embodiment, the first connecting component comprises first connecting pieces and second connecting pieces. The first connecting pieces are disposed at the first side end of the first sheet. The second connecting pieces are disposed at the third side end of the second sheet. The first connecting pieces are respectively detachably connected to the second connecting pieces.

The first connecting pieces and the second connecting pieces are buttons capable of being coupled to each other.

The buttons are disposed from front to rear.

The second connecting component comprises a third connecting piece and a fourth connecting piece.

The third connecting piece is disposed at the second side end of the first sheet. The fourth connecting piece is disposed at the fourth side end of the second sheet. The third connecting piece is detachably connected to the fourth connecting piece.

The third connecting piece is attached to the fourth connecting piece.

The second connecting component further comprises a fifth connecting piece and a sixth connecting piece.

The fifth connecting piece is disposed at the second side end of the first sheet. The sixth connecting piece is disposed at the fourth side end of the second sheet. The fifth connecting piece is detachably connected to the sixth connecting piece.

The third connecting piece and the fourth connecting piece are disposed close to a rear portion of the pet protection collar. The fifth connecting piece and the sixth connecting piece are disposed close to the front portion of the pet protection collar.

A first cover sheet is extended out from the second side end of the first sheet towards the fourth side end of the second sheet. The third connecting piece is disposed on the first cover sheet. A second cover sheet is extended out from the fourth side end of the second sheet towards the second side end of the first sheet. The sixth connecting piece is disposed on the second cover sheet. The second cover sheet and the first cover sheet are staggered.

The third connecting piece and the sixth connecting piece are loop fasteners, and the fourth connecting piece and the fifth connecting piece are hook fasteners.

The first cover sheet comprises a rear folding edge disposed at the second side end of the first sheet. A first decorative sheet is disposed on the second side end of the first sheet. The first decorative sheet is substantially symmetrically disposed with the first cover sheet with the rear folding edge of the first cover sheet as a symmetry axis.

The second cover sheet comprises a front folding edge disposed at the fourth side end of the second sheet. A second decorative sheet is disposed on the fourth side end of the second sheet. The second decorative sheet is substantially symmetrically disposed with the second cover sheet with the front folding edge of the second cover sheet as a symmetry axis.

The pet protection collar further comprises an adjusting cord. A first channel is defined in a rear side of the first rear portion. A second channel is disposed in a rear side of the second rear portion.

A first end of the adjusting cord is disposed outside the first channel. A second end of the adjusting cord passes through the first channel and the second channel in sequence and passes out of the second channel.

The first end of the adjusting cord is disposed close to the second side end of the first sheet, and the second end of the adjusting cord is disposed close to the fourth side end of the second sheet.

Cord locks are respectively disposed on the first end and the second end of the adjusting cord.

In one embodiment, any one of the first connecting component and the second connecting component is allowed to be opened or closed to wear or remove the pet protection collar, and the second connecting component is opened and closed to further adjust a size of the pet protection collar.

In one embodiment, the pet protection collar further comprises an adjusting cord. A first channel is defined in a rear side of the first rear portion. A second channel is disposed in a rear side of the second rear portion.

A first end of the adjusting cord is disposed outside the first channel. A second end of the adjusting cord passes through the first channel and the second channel in sequence and passes out of the second channel.

The present disclosure further provides a pet protection collar. The pet protection collar comprises a first sheet, a second sheet, a first connecting component, and a second connecting component.

The first sheet is substantially fan-shaped. The first sheet comprises a first front portion, a first rear portion, a first side end and a second side end. The first front portion extends from the first side end to the second side end. The first rear portion extends from the first side end to the second side end. A radius of the first front portion is greater than a radius of the first rear portion.

The second sheet is substantially fan-shaped. The second sheet comprises a second front portion, a second rear portion, a third side end, and a fourth side end. The second front portion extends from the third side end to the fourth side end. The second rear portion extends from the third side end to the fourth side end. A radius of the second front portion is greater than a radius of the second rear portion.

The first connecting component is configured to connect the first side end of the first sheet to the third side end of the second sheet. The second connecting component is configured to connect the second side end of the first sheet to the fourth side end of the second sheet, so that the first sheet and the second sheet are enclosed to form the pet protective collar that is substantially conical.

The second connecting component comprises a first cover sheet and a second cover sheet. The first cover sheet is close to a rear portion of the pet protection collar. The second cover sheet is close to a front portion of the rear portion of the pet protection collar. The second cover sheet and the first cover sheet are staggered.

The first cover sheet is disposed on the second side end of the first sheet and comprises a first attaching portion. A second attaching portion is disposed on the fourth side end of the second sheet.

The second cover sheet is disposed on the fourth side end of the second sheet and comprises a third attaching portion. A fourth attaching portion is disposed on the second side end of the first sheet.

By such an arrangement, the pet protection collar of the present disclosure is convenient for the pet to wear in daily life.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

The present disclosure is further described below with reference to the accompanying drawings and embodiments.

DETAILED DESCRIPTION

Figure 1:
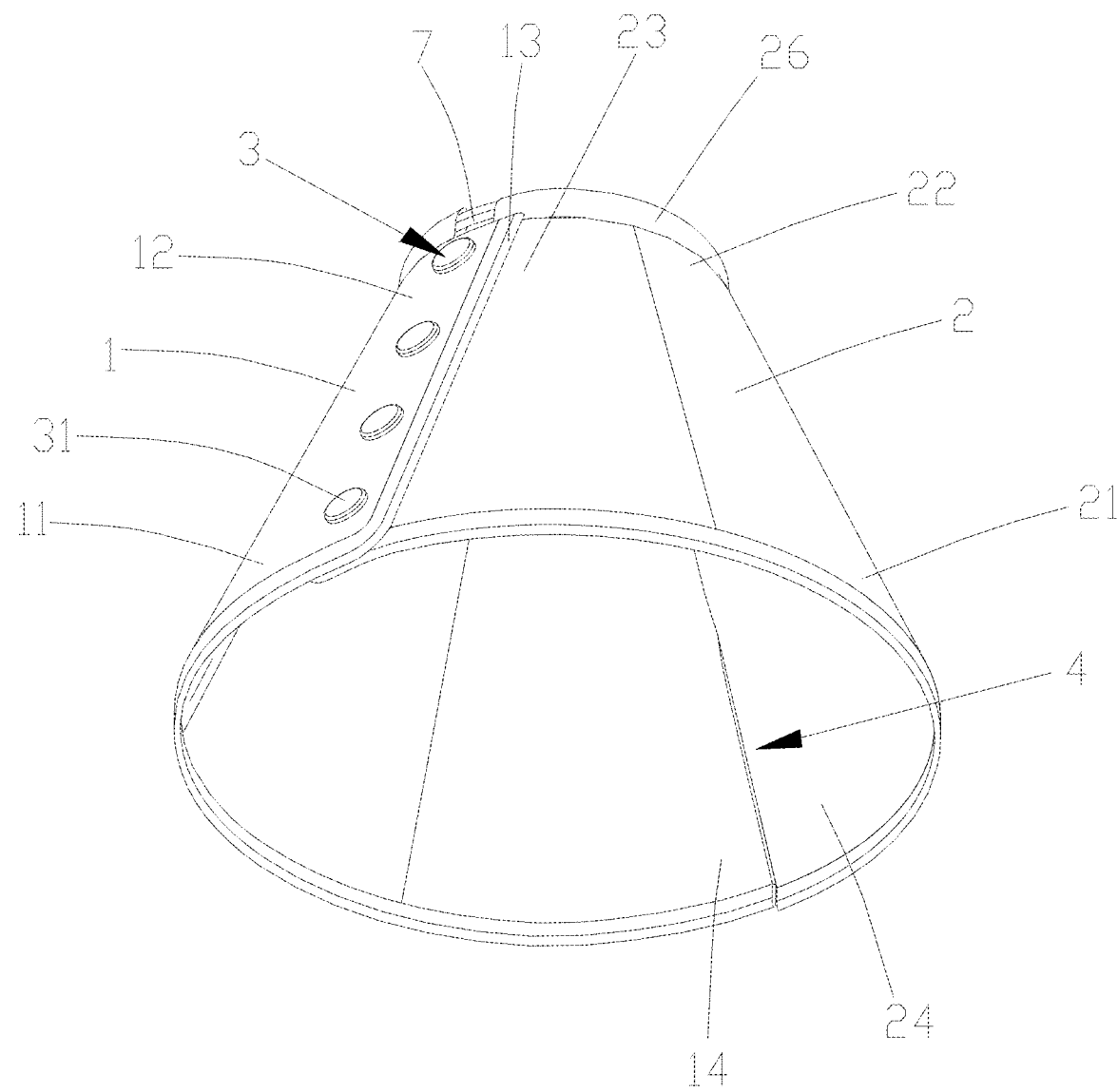
FIG. 1 is a perspective schematic diagram of a pet protection collar according to one embodiment of the present disclosure.
Figure 2:
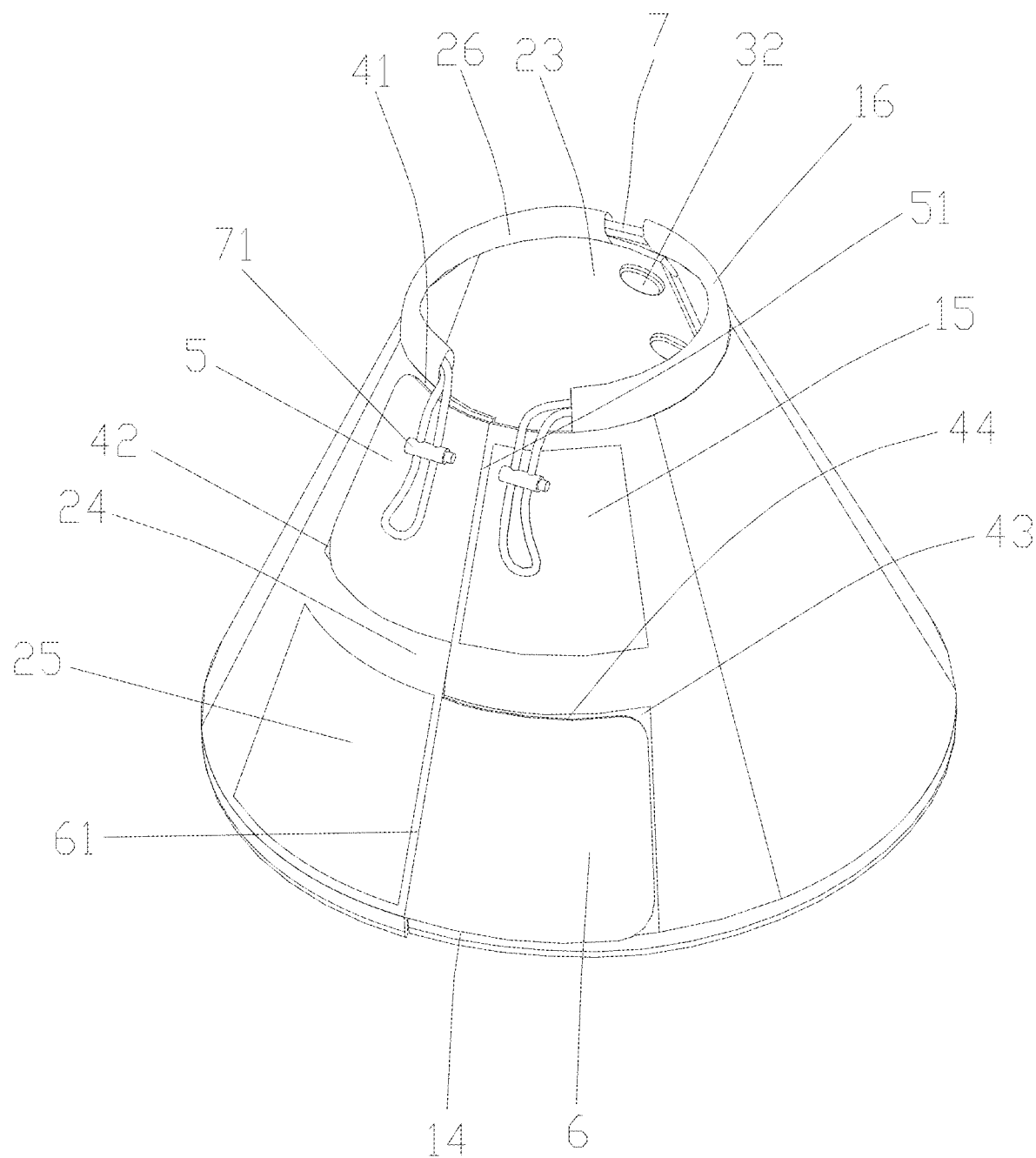
FIG. 2 is another perspective schematic diagram of the pet protection collar according to one embodiment of the present disclosure.
Figure 3:
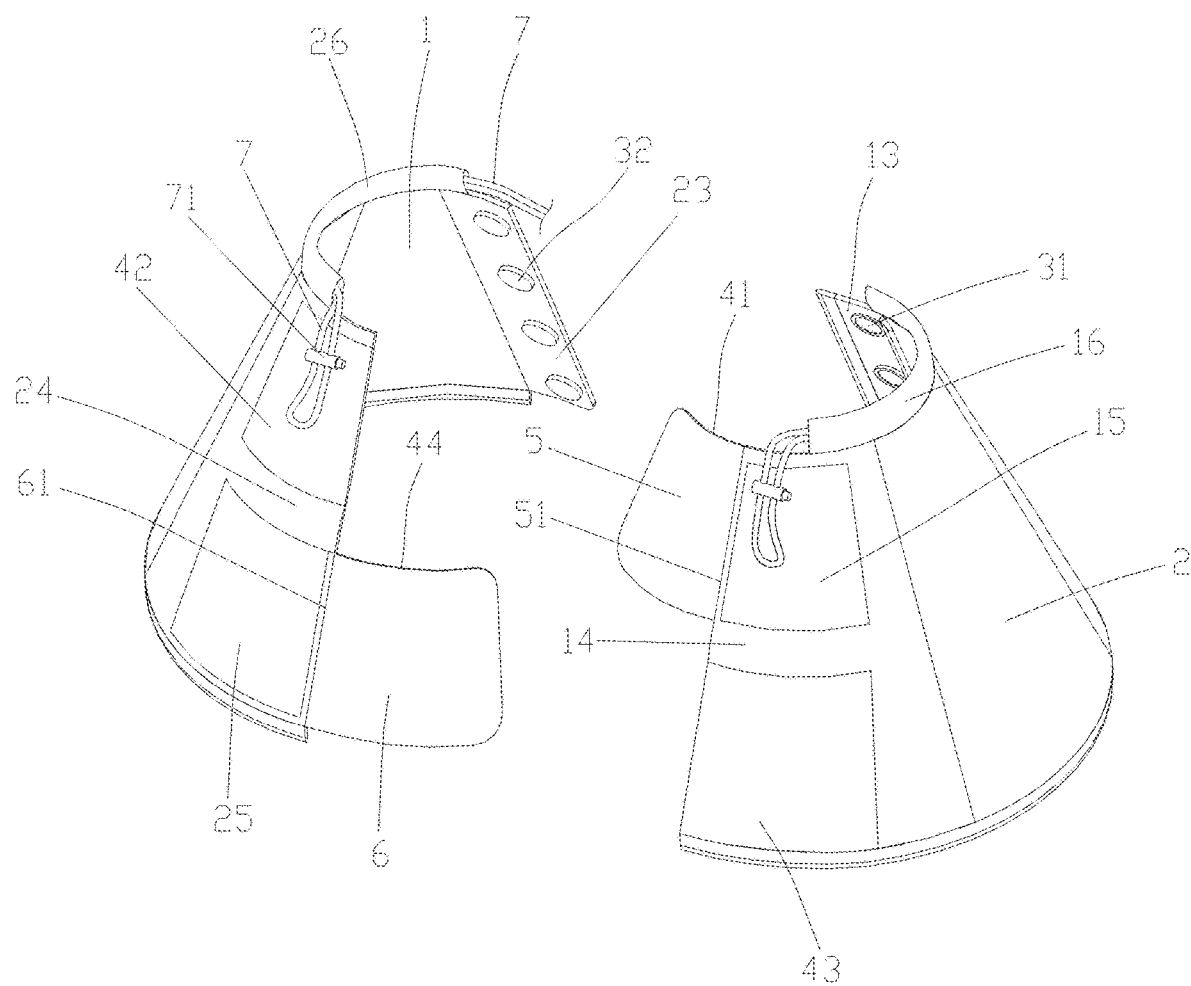
FIG. 3 is an exploded schematic diagram of the pet protection collar shown in FIG. 2.
Figure 4:
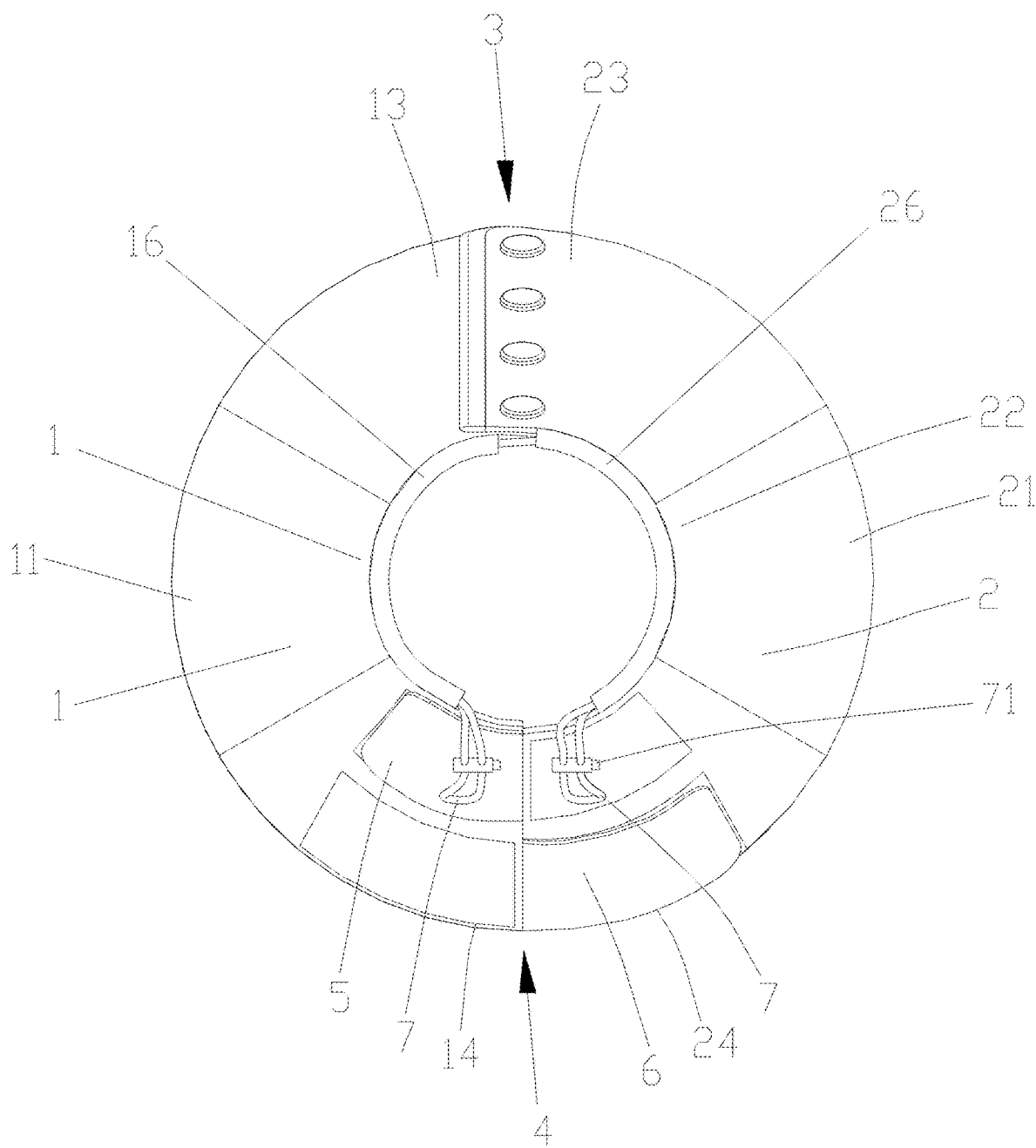
FIG. 4 is a top plan schematic diagram of the pet protection collar according to one embodiment of the present disclosure.
Figure 5:
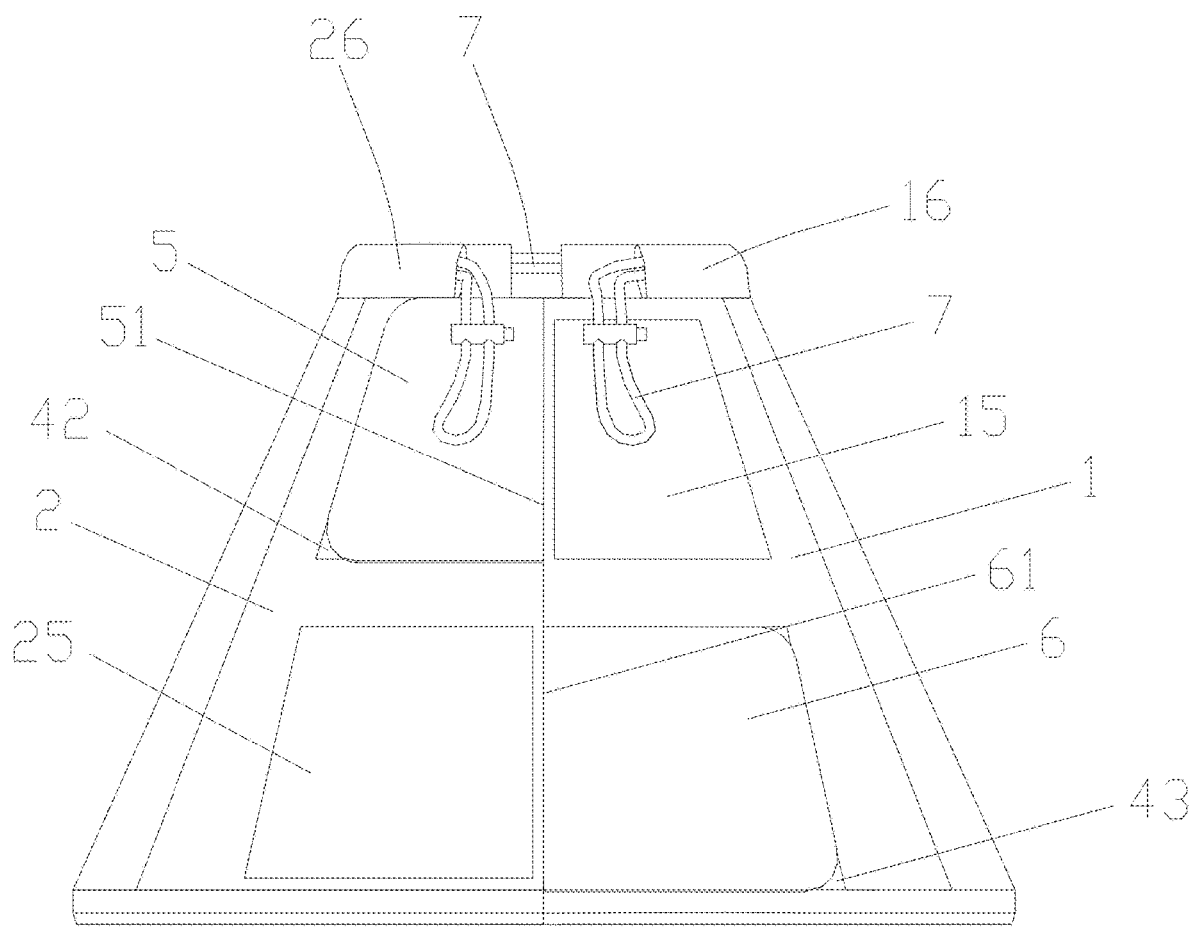
FIG. 5 is a front side schematic diagram of the pet protection collar according to one embodiment of the present disclosure.

As shown in FIGS. 1-5, the present disclosure provides a pet protection collar.

The pet protection collar comprises a first sheet 1, a second sheet 2, a first connecting component 3, and a second connecting component 4.

The first sheet 1 is substantially fan-shaped. The first sheet 1 comprises a first front portion 11, a first rear portion 12, a first side end 13 and a second side end 14. The first front portion 11 extends from the first side end 13 to the second side end 14. The first rear portion 12 extends from the first side end 13 to the second side end 14. A radius of the first front portion 11 is greater than a radius of the first rear portion 12.

The second sheet 2 is substantially fan-shaped. The second sheet 2 comprises a second front portion 21, a second rear portion 22, a third side end 23, and a fourth side end 24. The second front portion 21 extends from the third side end 23 to the fourth side end 24. The second rear portion 22 extends from the third side end 23 to the fourth side end 24. A radius of the second front portion 21 is greater than a radius of the second rear portion 22.

The first connecting component 3 is configured to connect the first side end 13 of the first sheet 1 to the third side end 23 of the second sheet 2. The second connecting component 4 is configured to connect the second side end 14 of the first sheet 1 to the fourth side end 24 of the second sheet 2, so that the first sheet 1 and the second sheet 2 are enclosed to form the pet protective collar that is substantially conical.

By providing the first connecting component and the second connecting component, the pet protection collar with a double opening and closing structure is formed, which is convenient for a pet to wear and use in daily life.

Specifically, the first rear portion 12 of the first sheet 1 and the second rear portion 22 of the second sheet 2 are enclosed to be worn on a neck of the pet. The first front portion 11 of the first sheet 1 and the second front portion 21 of the second sheet 2 are enclosed to surround a head of the pet.

Specifically, the first side end 13 of the first sheet 1 is detachably connected to the third side end 23 of the second sheet 2 through the first connecting component 3. The second side end 14 of the first sheet 1 is detachably connected to the fourth side end 24 of the second sheet 2 through the second connecting component 4. In this way, the pet protection collar is allowed to be opened or closed through any one of the first connecting component and the second connecting component.

In some embodiments, the first connecting component 3 comprises first connecting pieces 31 and second connecting pieces 32. The first connecting pieces 31 are disposed at the first side end 13 of the first sheet 1. The second connecting pieces 32 are disposed at the third side end 23 of the second sheet 2. The first connecting pieces 31 are respectively detachably connected to the second connecting pieces 32.

Specifically, the first connecting pieces 31 and the second connecting pieces 32 are buttons capable of being coupled to each other. There are four first connecting pieces 31 and four second connecting pieces 32. The four first connecting pieces 31 are disposed from front to rear, and four second connecting pieces 32 are disposed from front to rear. Because the first connecting pieces 31 and the second connecting pieces 32 are buttons, the first connecting pieces 31 and the second connecting pieces 32 snap together to form a reliable and stable opening and closing structure. Therefore, the first connecting pieces 31 and the second connecting pieces 32 are connected or separated when wearing or removing the pet protection collar. Therefore, the first connecting component is constantly in a closed state (i.e., with the first connecting pieces 31 and the second connecting pieces 32 connected to each other).

In some embodiments, the second connecting component 4 comprises a third connecting piece 41 and a fourth connecting piece 42.

The third connecting piece 41 is disposed at the second side end 14 of the first sheet 1, the fourth connecting piece 42 is disposed at the fourth side end 24 of the second sheet. The third connecting piece 41 is detachably connected to the fourth connecting piece 42.

Furthermore, the second connecting component 4 further comprises a fifth connecting piece 43 and a sixth connecting piece 44.

The fifth connecting piece 43 is disposed at the second side end 14 of the first sheet 1, the sixth connecting piece 44 is disposed at the fourth side end 24 of the second sheet 2. The fifth connecting piece 43 is detachably connected to the sixth connecting piece 44.

Furthermore, the third connecting piece 41 and the fourth connecting piece 42 are disposed close to a rear portion of the pet protection collar. The fifth connecting piece 43 and the sixth connecting piece 44 are disposed close to the front portion of the pet protection collar.

Furthermore, a first cover sheet 5 is extended out from the second side end 14 of the first sheet 1 towards the fourth side end 24 of the second sheet 2. The third connecting piece 41 is disposed on the first cover sheet 5. A second cover sheet 6 is extended out from the fourth side end 24 of the second sheet 2 towards the second side end 14 of the first sheet 1. The sixth connecting piece 44 is disposed on the second cover sheet 6. The second cover sheet 6 and the first cover sheet 5 are staggered.

Furthermore, the third connecting piece 41 and the sixth connecting piece 44 are loop fasteners, and the fourth connecting piece 42 and the fifth connecting piece 43 are hook fasteners. That is, the third connecting piece 41 is attached to the fourth connecting piece 42, and the fifth connecting piece 43 is attached to the sixth connecting piece 44.

When the pet protection collar is worn on the neck of the pet, the pet protection collar is able to adapt to necks of pets of different sizes by adjusting a connecting area between the third connecting piece and the fourth connecting piece. Similarly, the pet protection collar is able to be adapted to heads of pets of different sizes by adjusting a connecting area between the fifth connecting piece and the sixth connecting piece.

In addition, since the third connecting piece and the fifth connecting piece are staggered, and the fourth connecting piece and the sixth connecting piece are staggered, an adjustment of the third connecting piece and the fourth connecting piece is independent from an adjustment of the fifth connecting piece and the sixth connecting piece.

when an enclosed space around the neck of the pet needs to be adjusted, the third connecting piece and the fourth connecting piece are separated for subsequent adjustments, which is convenient to use. When an enclosed space around the head needs to be adjusted, the fifth connecting piece and the sixth connecting piece are separated for subsequent adjustments, which is convenient to use. Therefore, the second connecting component is frequently opened and closed.

In some embodiments, the first cover sheet 5 comprises a rear folding edge 51 disposed at the second side end 14 of the first sheet 1. A first decorative sheet 15 is disposed on the second side end 14 of the first sheet 1. The first decorative sheet 15 is substantially symmetrically disposed with the first cover sheet 5 with the rear folding edge 51 of the first cover sheet 5 as a symmetry axis.

The second cover sheet 6 comprises a front folding edge 61 disposed at the fourth side end 24 of the second sheet 2. A second decorative sheet 25 is disposed on the fourth side end 24 of the second sheet 2. The second decorative sheet 25 is substantially symmetrically disposed with the second cover sheet 6 with the front folding edge 61 of the second cover sheet 6 as a symmetry axis. In this way, an appearance design of the pet protection collar is more reasonable, which increases its appeal to consumers.

In some embodiments, the pet protection collar further comprises an adjusting cord 7. A first channel 16 is defined in a rear side of the first rear portion 12. A second channel 26 is disposed in a rear side of the second rear portion 22. A first end of the adjusting cord 7 is disposed outside the first channel 16. A second end of the adjusting cord 7 passes through the first channel 16 and the second channel 26 in sequence and passes out of the second channel 26. In this way, the adjusting cord is able to be adjusted to adjust a tightness of the pet protection collar on the neck of the pet. Moreover, even when the first connecting component and the second connecting component are both in an open state, the adjusting cord still connects the first sheet to the second sheet to prevent accessories of the pet protection collar from being lost and facilitate the storage and use of the pet protection collar.

Furthermore, the first end of the adjusting cord 7 is disposed close to the second side end 14 of the first sheet 1, and the second end of the adjusting cord 7 is disposed close to the fourth side end 24 of the second sheet 2. Two cord locks 71 are respectively disposed on the first end and the second end of the adjusting cord 7.

The two cord locks 71 are frequently locked and unlocked corresponding to the opening and closing of the second connecting component.

Figure 6:
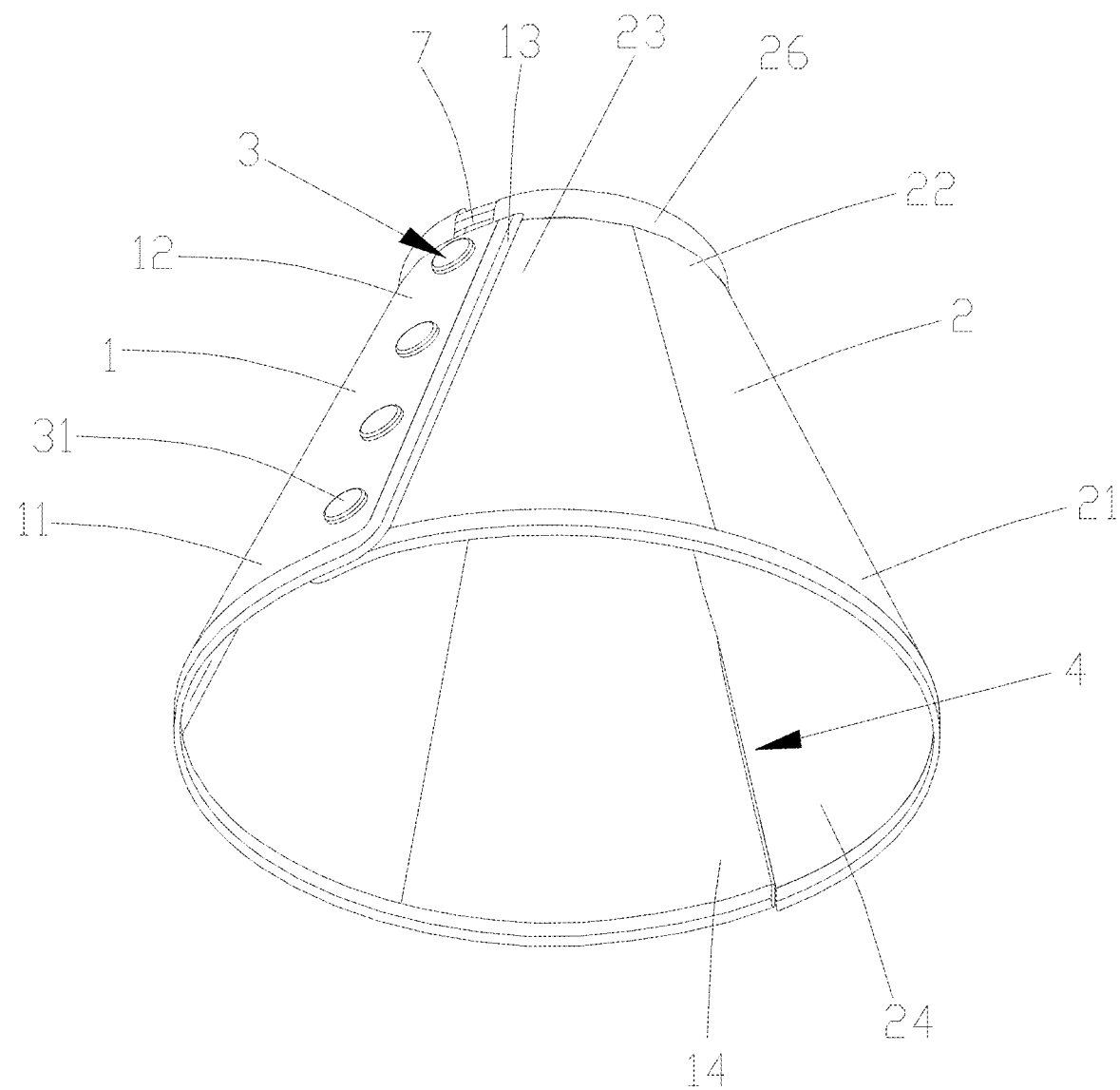
FIG. 6 is a perspective schematic diagram of the pet protection collar according to another embodiment of the present disclosure.
Figure 7:
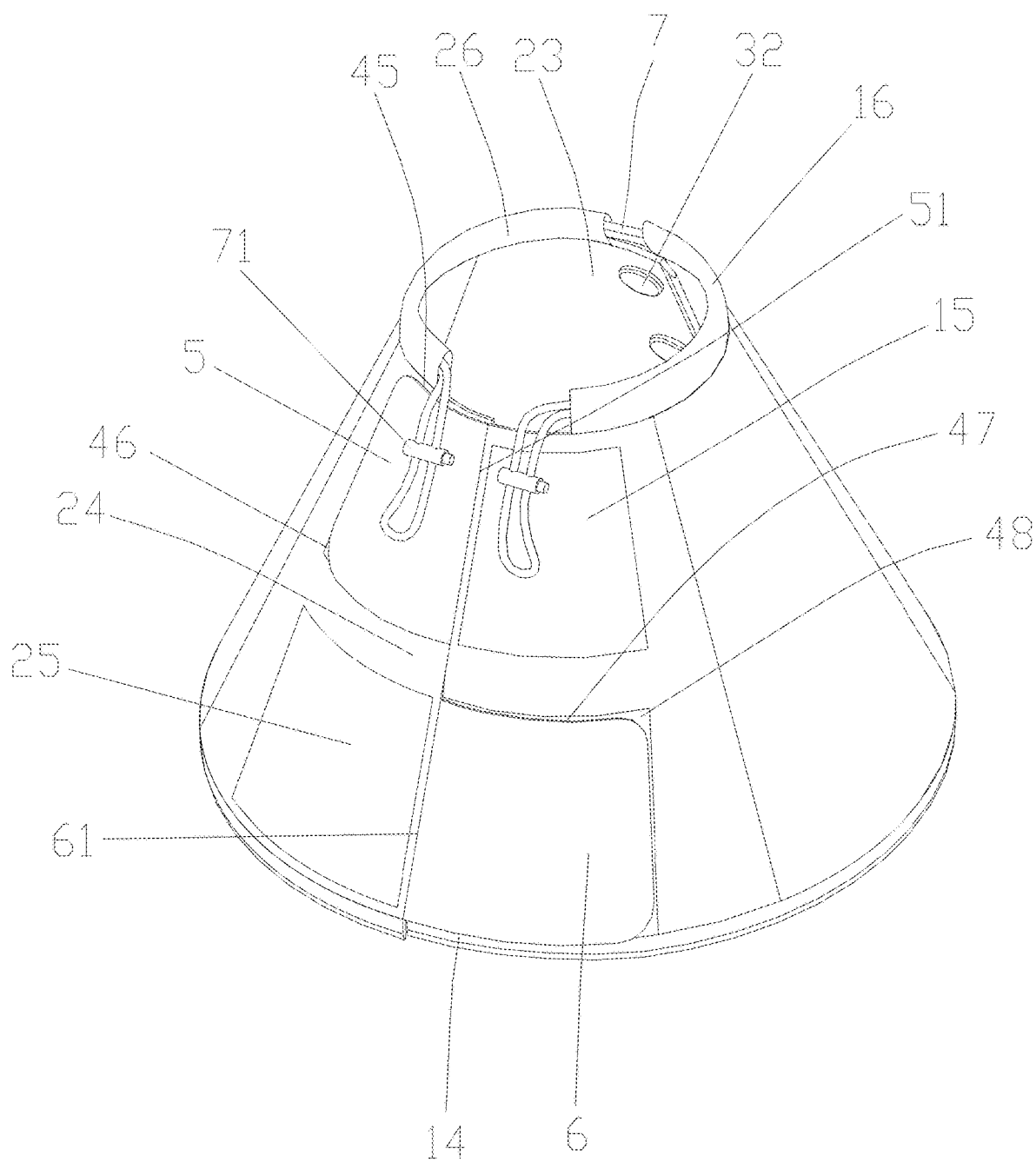
FIG. 7 is another perspective schematic diagram of the pet protection collar according to another embodiment of the present disclosure.

As shown in FIGS. 6 and 7, in another embodiment, the present disclosure further provides a pet protection collar. The pet protection collar comprises a first sheet 1, a second sheet 2, a first connecting component 3, and a second connecting component 4.

The first sheet 1 is substantially fan-shaped. The first sheet 1 comprises a first front portion 11, a first rear portion 12, a first side end 13 and a second side end 14. The first front portion 11 extends from the first side end 13 to the second side end 14. The first rear portion 12 extends from the first side end 13 to the second side end 14. A radius of the first front portion 11 is greater than a radius of the first rear portion 12.

The second sheet 2 is substantially fan-shaped. The second sheet 2 comprises a second front portion 21, a second rear portion 22, a third side end 23, and a fourth side end 24. The second front portion 21 extends from the third side end 23 to the fourth side end 24. The second rear portion 22 extends from the third side end 23 to the fourth side end 24. A radius of the second front portion 21 is greater than a radius of the second rear portion 22.

The first connecting component 3 is configured to connect the first side end 13 of the first sheet 1 to the third side end 23 of the second sheet 2. The second connecting component 4 is configured to connect the second side end 14 of the first sheet 1 to the fourth side end 24 of the second sheet 2, so that the first sheet 1 and the second sheet 2 are enclosed to form the pet protective collar that is substantially conical.

The second connecting component 4 comprises a first cover sheet 5 and a second cover sheet 6. The first cover sheet 5 is close to a rear portion of the pet protection collar. The second cover sheet 6 is close to a front portion of the rear portion of the pet protection collar. The second cover sheet 6 and the first cover sheet 5 are staggered.

The first cover sheet 5 is disposed on the second side end 14 of the first sheet 1 and comprises a first attaching portion 45. A second attaching portion 46 is disposed on the fourth side end 24 of the second sheet 2.

The second cover sheet 6 is disposed on the fourth side end 24 of the second sheet 2 and comprises a third attaching portion 47. A fourth attaching portion 48 is disposed on the second side end 14 of the first sheet 1.

Specifically, the first attaching portion 45 and the second attaching portion 46 are respectively a hook fastener and a loop fastener of a first Velcro, and the third attaching portion 47 and fourth attaching portion 48 are respectively a hook fastener and a loop fastener of a second Velcro. A detachable connection of the first attaching portion 45 and second attaching portion 46, as well as a detachable connection of the third attaching portion 47 and fourth fitting attaching portion, facilitates the operation and use of the pet protection collar.

The above is one or more embodiments provided in conjunction with specific content, and the specific implementation of the present disclosure is not limited to these descriptions. Any similarity or equivalence with the method, structure, etc. of the present disclosure, or any technical deduction or replacement based on the concept of the present disclosure, shall fall within the protection scope of the present disclosure.

What is claimed is:

1. A pet protection collar, comprising:
    a first sheet;
    a second sheet;
    a first connecting component; and
    a second connecting component;
    wherein the first sheet is substantially fan-shaped, the first sheet comprises a first front portion, a first rear portion, a first side end and a second side end, the first front portion extends from the first side end to the second side end, the first rear portion extends from the first side end to the second side end, and a radius of the first front portion is greater than a radius of the first rear portion;
    wherein the second sheet is substantially fan-shaped, the second sheet comprises a second front portion, a second rear portion, a third side end, and a fourth side end, the second front portion extends from the third side end to the fourth side end, the second rear portion extends from the third side end to the fourth side end, and a radius of the second front portion is greater than a radius of the second rear portion;
    wherein the first connecting component is configured to connect the first side end of the first sheet to the third side end of the second sheet, and the second connecting component is configured to connect the second side end of the first sheet to the fourth side end of the second sheet, so that the first sheet and the second sheet are enclosed to form the pet protective collar that is substantially conical.

2. The pet protection collar according to claim 1, wherein the first rear portion of the first sheet and the second rear portion of the second sheet are enclosed and configured to be worn on a neck of a pet, and the first front portion of the first sheet and the second front portion of the second sheet are enclosed and configured to surround a head of the pet.

3. The pet protection collar according to claim 1, wherein the first side end of the first sheet is detachably connected to the third side end of the second sheet through the first connecting component, and the second side end of the first sheet is detachably connected to the fourth side end of the second sheet through the second connecting component.

4. The pet protection collar according to claim 3, wherein the first connecting component comprises first connecting pieces and second connecting pieces;
    wherein the first connecting pieces are disposed at the first side end of the first sheet, the second connecting pieces are disposed at the third side end of the second sheet, and the first connecting pieces are respectively detachably connected to the second connecting pieces.

5. The pet protection collar according to claim 4, wherein the first connecting pieces and the second connecting pieces are buttons capable of being coupled to each other.

6. The pet protection collar according to claim 5, wherein the buttons are disposed from a front to a rear of said pet protection collar.

7. The pet protection collar according to claim 5, wherein the second connecting component comprises a third connecting piece and a fourth connecting piece;
    wherein the third connecting piece is disposed at the second side end of the first sheet, the fourth connecting piece is disposed at the fourth side end of the second sheet, and the third connecting piece is detachably connected to the fourth connecting piece.

8. The pet protection collar according to claim 7, wherein the third connecting piece is attached to the fourth connecting piece.

9. The pet protection collar according to claim 7, wherein the second connecting component further comprises a fifth connecting piece and a sixth connecting piece;
    wherein the fifth connecting piece is disposed at the second side end of the first sheet, the sixth connecting piece is disposed at the fourth side end of the second sheet, and the fifth connecting piece is detachably connected to the sixth connecting piece.

10. The pet protection collar according to claim 9, wherein the third connecting piece and the fourth connecting piece are disposed close to a rear portion of the pet protection collar, and the fifth connecting piece and the sixth connecting piece are disposed close to a front portion of the pet protection collar.

11. The pet protection collar according to claim 10, wherein a first cover sheet is extended out from the second side end of the first sheet towards the fourth side end of the second sheet, the third connecting piece is disposed on the first cover sheet, a second cover sheet is extended out from the fourth side end of the second sheet towards the second side end of the first sheet, the sixth connecting piece is disposed on the second cover sheet, and the second cover sheet and the first cover sheet are staggered.

12. The pet protection collar according to claim 11, wherein the third connecting piece and the sixth connecting piece are loop fasteners, and the fourth connecting piece and the fifth connecting piece are hook fasteners.

13. The pet protection collar according to claim 11, wherein the first cover sheet comprises a rear folding edge disposed at the second side end of the first sheet, a first decorative sheet is disposed on the second side end of the first sheet, and the first decorative sheet is substantially symmetrically disposed with the first cover sheet with the rear folding edge of the second cover sheet as a symmetry axis.

14. The pet protection collar according to claim 11, wherein the second cover sheet comprises a front folding edge disposed at the fourth side end of the second sheet, a second decorative sheet is disposed on the fourth side end of the second sheet, and the second decorative sheet is substantially symmetrically disposed with the second cover sheet with the front folding edge of the first cover sheet as a symmetry axis.

15. The pet protection collar according to claim 11, wherein the pet protection collar further comprises an adjusting cord, a first channel is defined in a rear side of the first rear portion, and a second channel is disposed in a rear side of the second rear portion;
   wherein a first end of the adjusting cord is disposed outside the first channel, and a second end of the adjusting cord passes through the first channel and the second channel in sequence and passes out of the second channel.

16. The pet protection collar according to claim 15, wherein the first end of the adjusting cord is disposed close to the second side end of the first sheet, and the second end of the adjusting cord is disposed close to the fourth side end of the second sheet.

17. The pet protection collar according to claim 16, wherein cord locks are respectively disposed on the first end and the second end of the adjusting cord.

18. The pet protection collar according to claim 1, wherein any one of the first connecting component and the second connecting component is configured to be opened or closed to wear or remove the pet protection collar, and the second connecting component is configured to be opened and closed to further adjust a size of the pet protection collar when the pet protection collar is worn on a pet.

19. The pet protection collar according to claim 1, wherein the pet protection collar further comprises an adjusting cord, a first channel is defined in a rear side of the first rear portion, and a second channel is disposed in a rear side of the second rear portion;
   wherein a first end of the adjusting cord is disposed outside the first channel, and a second end of the adjusting cord passes through the first channel and the second channel in sequence and passes out of the second channel.

20. A pet protection collar, comprising:
   a first sheet;
   a second sheet;
   a first connecting component; and
   a second connecting component;
   wherein the first sheet is substantially fan-shaped, the first sheet comprises a first front portion, a first rear portion, a first side end and a second side end, the first front portion extends from the first side end to the second side end, the first rear portion extends from the first side end to the second side end, and a radius of the first front portion is greater than a radius of the first rear portion;
   wherein the second sheet is substantially fan-shaped, the second sheet comprises a second front portion, a second rear portion, a third side end, and a fourth side end, the second front portion extends from the third side end to the fourth side end, the second rear portion extends from the third side end to the fourth side end, and a radius of the second front portion is greater than a radius of the second rear portion;
   wherein the first connecting component is configured to connect the first side end of the first sheet to the third side end of the second sheet, and the second connecting component is configured to connect the second side end of the first sheet to the fourth side end of the second sheet, so that the first sheet and the second sheet are enclosed to form the pet protective collar that is substantially conical;
   wherein the second connecting component comprises a first cover sheet and a second cover sheet, the first cover sheet is close to a rear portion of the pet protection collar, the second cover sheet is close to a front portion of the pet protection collar, and the second cover sheet and the first cover sheet are staggered;
   wherein the first cover sheet is disposed on the second side end of the first sheet and comprises a first attaching portion, and a second attaching portion is disposed on the fourth side end of the second sheet;
   wherein the second cover sheet is disposed on the fourth side end of the second sheet and comprises a third attaching portion, and a fourth attaching portion is disposed on the second side end of the first sheet.

* * * * *